J. B. AUSTIN.
PIPE UNION.
APPLICATION FILED FEB. 8, 1910.
982,028.
Patented Jan. 17, 1911.
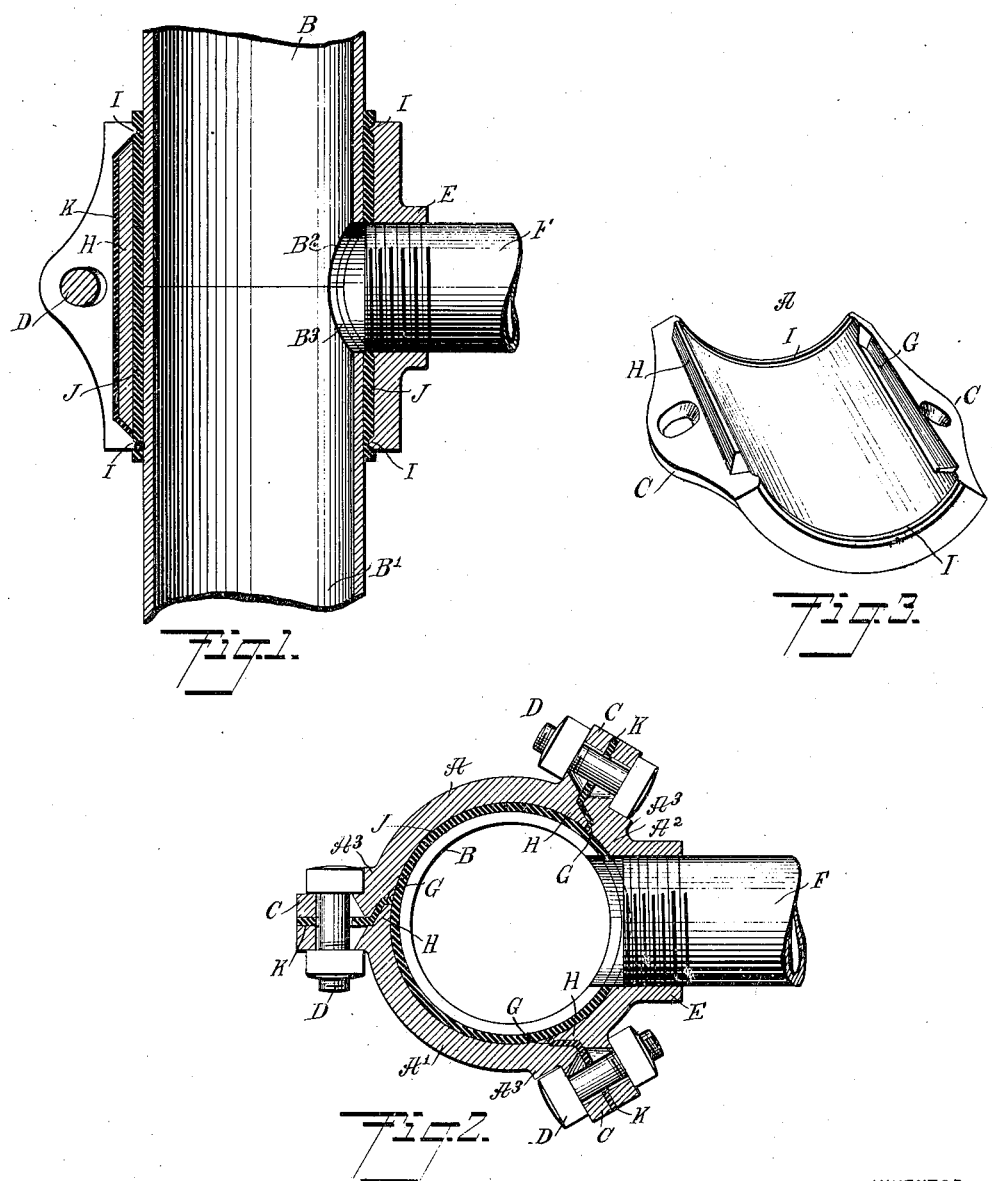
WITNESSES:
INVENTOR
Josiah B. Austin
BY
ATTORNEYS

UNITED STATES PATENT OFFICE.

JOSIAH BOONE AUSTIN, OF SAN DIEGO, CALIFORNIA.

PIPE-UNION.

982,028. Specification of Letters Patent. Patented Jan. 17, 1911.

Application filed February 8, 1910. Serial No. 542,662.

*To all whom it may concern:*

Be it known that I, JOSIAH B. AUSTIN, a citizen of the United States, and a resident of San Diego, in the county of San Diego and State of California, have invented a new and Improved Pipe-Union, of which the following is a full, clear, and exact description.

The invention relates to pipe couplings, and its object is to provide a new and improved pipe union, more especially designed for joining adjacent main pipe ends and making provision for a branch connection, the union being arranged to permit convenient and quick assembling of the parts and fastening the same in place on the main pipe ends, with a view to allow a ready expansion and contraction of the pipe ends of the union parts, and to provide sufficient elasticity for the deflection of the pipes without danger of damaging the joint. For the purpose mentioned, the union is made of, at least, three sections bolted together, one of the sections having a nipple for engagement by a branch pipe.

A practical embodiment of the invention is represented in the accompanying drawings forming a part of this specification, in which similar characters of reference indicate corresponding parts in all the views.

Figure 1 is a sectional plan view of the pipe union with the main and branch pipes in position; Fig. 2 is a cross section of the same; and Fig. 3 is a perspective view of one of the sections.

The pipe union consists of, at least, three segmental sections A, A', A², for inclosing the adjacent ends of main pipes B, B', as plainly indicated in Figs. 1 and 2, and the said sections A, A', A², are provided with outwardly-extending flanges C, engaged by bolts D for fastening the sections together. One of the sections, as shown, the section A², is provided with an outwardly-extending nipple E for engagement by a branch pipe F, which may be screwed, calked or otherwise fastened in the nipple E, it being understood that the adjacent ends of the main pipes B and B' are cut out, as at B², B³, to connect the interior of the main pipes B, B' with the branch pipe F.

Each of the sections A, A', A² is provided at one side with a lengthwise-extending recess G, terminating a distance from the ends of the section (see Fig. 3), and on the opposite side of each section is arranged a lengthwise-extending tongue H, adapted to pass into the recess G of a next adjacent section, as will be readily understood by reference to Fig. 2. The ends of each section A, A', A² are provided with inwardly-extending ridges I, so as to form a circular space within the connected sections A, A', A², and the exterior surfaces of the pipes B, B' for the reception of a packing J, of rubber or other suitable material, and extending over the joint of the ends of the pipes B, B'. Packing plates K, of rubber or like material are interposed between adjacent flanges C, and the inner ends of the said packing plates K extend into the recesses G, to be engaged by the tongues H of adjacent sections, so that when the sections A, A', A² are assembled with the packings J and K in place, and the bolts D are screwed up, then an exceedingly tight joint is made to prevent leakage of the steam, air, water or other fluid passing through the pipes B, B' and the branch pipe F.

As indicated in Fig. 2, each of the sections A, A', A² is provided with an offset A³ for engagement by the head of the corresponding bolt D, so as to prevent the said bolt from turning while screwing on the nuts thereof on fastening the flanges C together.

Now it will be seen that by the arrangement described, the ends of the pipes B, B' can readily expand and contract, as they are completely surrounded by a packing and the packing is firmly pressed in contact with the pipes B, B' by the ridges I, to prevent leakage, at the same time the pipes can be deflected without danger of damage to the joint.

By having the interlocking tongues H, the recesses G and the packing plates K arranged as described, it is evident that leakage at the joints of the sections is prevented.

Having thus described my invention, I claim as new and desire to secure by Letters Patent:

The combination with two pipes having their adjacent ends cut away to form an opening, of a coupling, consisting of three sections each provided with apertured flanges, a longitudinal recess at one side, a longitudinal tongue on the other side and an inwardly extending ridge at each end, one of the sections being provided with an outwardly extending nipple for engagement by a branch pipe, a packing interposed between the sections and the pipes, the packing extending beyond the ends of the sections, packing plates interposed between the flanges of the sections and extending into the recesses of the sections, and bolts passing through the apertures of the said flanges.

In testimony whereof I have signed my name to this specification in the presence of two subscribing witnesses.

JOSIAH BOONE AUSTIN.

Witnesses:
 HENRY O. DAVISON,
 H. J. CANFIELD.